United States Patent [19]

Mori et al.

[11] Patent Number: 5,384,382
[45] Date of Patent: Jan. 24, 1995

[54] CROSSLINKABLE POLYSILANE COMPOSITIONS AND CURED PRODUCTS THEREOF

[75] Inventors: Shigeru Mori; Eiichi Tabei; Hisashi Umehara, all of Kawasaki, Japan

[73] Assignee: Shin-Etsu Chemical Co., Ltd., Tokyo, Japan

[21] Appl. No.: 96,273

[22] Filed: Jul. 26, 1993

[30] Foreign Application Priority Data

Jul. 31, 1992 [JP] Japan ................................ 4-225166
Jul. 31, 1992 [JP] Japan ................................ 4-225167
Jul. 31, 1992 [JP] Japan ................................ 4-225168
Jul. 31, 1992 [JP] Japan ................................ 4-225169

[51] Int. Cl.$^6$ ............................................. C08G 77/08
[52] U.S. Cl. ...................................... 528/15; 528/21; 528/34
[58] Field of Search .......................... 528/15, 21, 34

[56] References Cited

U.S. PATENT DOCUMENTS 4,639,501 1/1987 Seyferth et al. ..................... 528/15
4,719,273 1/1988 Seyferth et al. ..................... 528/15
4,737,552 4/1988 Baney et al. ........................ 528/15
5,260,377 11/1993 Weber et al. ....................... 528/15

OTHER PUBLICATIONS

Robert West, Journal of Organometallic Chemistry, vol. 300, pp. 327–346, 1986 "The Polysilane High Polymers".

Primary Examiner—Melvyn I. Marquis
Attorney, Agent, or Firm—Birch, Stewart, Kolasch & Birch

[57] ABSTRACT

Crosslinkable polysilane compositions contain (1) an alkenylsiloxy—terminated polysilane and a compound having at least three hydrosilyl groups in a molecule, (2) a hydro—siloxy—terminated polysilane and a compound having at least three alkenyl groups in a molecule, (3) a hydro—terminated polysilane and a compound having at least three alkenyl groups in a molecule, or (4) an alkenyl—terminated polysilane and a compound having at least three hydrosilyl groups in a molecule. By effecting hydrosilylation reaction between the components in the presence of a hydrosilylation catalyst, a tough crosslinked film is obtained without causing scission of a polysilane chain.

24 Claims, No Drawings

CROSSLINKABLE POLYSILANE COMPOSITIONS AND CURED PRODUCTS THEREOF

BACKGROUND OF THE INVENTION

1. Field of the Invention

This invention relates to a crosslinkable polysilane composition which cures into a solvent—insoluble, tough, crosslinked polysilane film, and a cured product thereof.

2. Prior Art

Among siloxane compositions, those compositions which cure through hydrosilylation reaction have the advantage that curing takes place quickly to the deep interior without forming by—products and thus have found a wide variety of applications, for example, as molded rubber, adhesives, potting compounds for electric and electronic parts, release coatings for paper and film, and the like.

One reported examples of curable polysilane compositions which cure through hydrosilylation reaction is Robert West, Journal of Organometallic Chemistry, Vol. 300, pp. 327-346, 1986, which describes a composition comprising a polysilane having hydrogen as a side chain substituent and trivinylphenylsilane, which is cured with a chloroplatinic acid catalyst. This system, however, has the problem that the side chain substituent is less reactive so that the polysilane chain may be scissored by the chloroplatinic acid catalyst and then oxidized.

Also reported in the same literature are a polysilane curing method using a photo—crosslinking reaction of a polysilane having an alkenyl group in a side chain alone and a curing method using a photo—crosslinking reaction between a polysilane and a polyfunctional unsaturated compound. These methods rely on scission of the polysilane chain and thus have the problem that the crosslinked film cannot retain the properties of polysilane.

Most polysilanes are soluble in various conventional organic solvents and films can be formed from such polysilane solution. However, it is difficult to form thick films by increasing the solution viscosity because a certain limit exists in solubility. Thus the use of polysilanes is limited in applications requiring thick films.

SUMMARY OF THE INVENTION

Therefore, an object of the present invention is to provide a crosslinkable polysilane composition which cures to a relatively thick film having properties equivalent to those of polysilane without causing scission of the polysilane chain upon crosslinking reaction.

Another object is to provide a cured product of such a composition.

We have found that the above and other objects are attained by effecting hydro—silylation reaction (1) between an alkenyl—siloxy—terminated polysilane and a compound having at least three hydrosilyl groups in a molecule, (2) between a hydrosiloxy—terminated polysilane and a compound having at least three alkenyl groups in a molecule, (3) between a hydro—terminated polysilane and a compound having at least three alkenyl groups in a molecule, and (4) between an alkenyl—terminated polysilane and a compound having at least three hydrosilyl groups in a molecule, all in the presence of a hydrosilylation catalyst. This process is effective in avoiding scission of a polysilane chain, especially when the catalyst is a rhodium metal complex.

Since the polysilane having an alkenyl—siloxy group at either end is reactive with a compound having hydrosilyl groups ($\equiv$SiH), the polysilane having a hydrosiloxy group at either end is reactive with a compound having alkenyl groups, the polysilane having a hydrosilyl group ($\equiv$SiH) at either end is reactive with a polyfunctional compound having alkenyl groups, and the polysilane having an alkenyl group at either end is reactive with a compound having hydrosilyl groups ($\equiv$SiH), these combinations readily undergo crosslinking and curing simply by heating without causing scission of the polysilane chain, resulting in crosslinked polysilane films which are insoluble in solvents. Because of solvent insolubility, such films can be laid one on another to form an overall thick film. Quite interestingly, the crosslinked polysilane film of the terminally crosslinked type is very tough and will find application as material requiring durability in terms of wear resistance and so on.

In a first form, the invention provides a crosslinkable polysilane composition comprising (A) an alkenyl—siloxy—terminated polysilane, (B) a compound having at least three hydrosilyl groups in a molecule, and (C) a hydrosilylation catalyst.

In a second form, the invention provides a crosslinkable polysilane composition comprising (D) a hydrosiloxy—terminated polysilane, (E) a compound having at least three alkenyl groups in a molecule, and (C) a hydrosilylation catalyst.

In a third form, the invention provides a crosslinkable polysilane composition comprising (F) a hydro—terminated polysilane, (E) a compound having at least three alkenyl groups in a molecule, and (C) a hydrosilylation catalyst.

In a fourth form, the invention provides a crosslinkable polysilane composition comprising (G) an alkenyl—terminated polysilane, (B) a compound having at least three hydrosilyl groups in a molecule, and (C) a hydrosilylation catalyst.

Hereinafter, the term X—terminated means that the polysilane is terminated with X at both ends of its molecular chain unless otherwise stated.

DETAILED DESCRIPTION OF THE INVENTION

In the first form, the crosslinkable polysilane composition of the invention includes an alkenylsiloxy—terminated polysilane as essential component (A). Any of the polysilanes which are terminated with an alkenylsiloxy group at either end may be used although preferred are those of the following general formula (1).

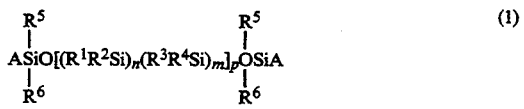

In formula (1), A is an alkenyl group having 2 to 12 carbon atoms, preferably 2 to 10 carbon atoms, for example, vinyl, allyl and propenyl groups. $R^1$, $R^2$, $R^3$, $R^4$, $R^5$, and $R^6$ are independently a substituted or unsubstituted alkyl group having 1 to 12 carbon atoms, preferably 1 to 10 carbon atoms or a substituted or unsubstituted aryl group. Exemplary alkyl groups are methyl, ethyl and propyl groups, and exemplary aryl groups are phenyl and tolyl groups. Letters n, m and p are integers satisfying $0 \leq n \leq 10$, $0 \leq m \leq 10$, $n+m \geq 10$, and $p \geq 1$. The letter is preferably at least especially at least to exhibit photoconductive property.

For the preparation of the alkenylsiloxy-terminated polysilane of formula (1), the method of U.S. Ser. No. 68/066,513, filed Jan. 21, 1993, U.S. Pat. No. 5,319,051 assigned to the same assignee as the present invention is advantageously utilized. More specifically, it is synthesized by first synthesizing a chloro—terminated polysilane of formula (a), hydrolyzing the chloro—terminated polysilane to yield a hydroxy—terminated polysilane of formula (b), and reacting the hydroxy—terminated polysilane with an alkenyl—containing chlorosilane of formula (c) in alkali.

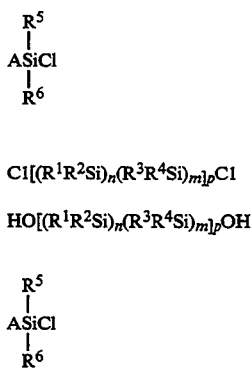

In these formulae, A, $R^1$ to $R^6$, n, m and p are as defined above.

The chloro—terminated polysilane of formula (a) is prepared by first effecting coupling reaction of a dichlorosilane with an alkali metal such as sodium for forming a polysilane according to U.S. Ser. No. 08/006,487, filed Jan. 21, 1993, U.S. Pat. No. 5,292,415. The dichlorosilanes which can be used herein include dialkyldichlorosilanes, alkylaryldichloro—silanes, alkyl(substituted aryl)dichlorosilanes, and di(substituted aryl)dichlorosilanes. The resulting polysilane preferably has a number average molecular weight (Mn) of 1,000 to 1,000,000, especially 5,000 to 1,000,000.

Next, the polysilane is dissolved in a chlorinated hydrocarbon solvent such as carbon tetrachloride, sealingly filled in a Pyrex or quartz reaction tube, and irradiated with UV-rays in an inert gas atmosphere such as nitrogen and argon gas using a high pressure mercury lamp (312 nm), producing a chloro—terminated polysilane.

After exposure to a predetermined dose of uv, the reaction solution is concentrated to ½ to 1/5 in volume. A sufficient amount of hexane is added to the concentrate to cause the chloro—terminated polysilane to precipitate. Through filtration and drying, the chloro—terminated polysilane of formula (a) is obtained as white powder.

From the chloro—terminated polysilane, a hydroxy—terminated polysilane is synthesized. Preferably the chloro—terminated polysilane is first dissolved in a solvent such as tetra—hydrofuran (THF), toluene and xylene to a concentration of about 1 to 20% by weight, more preferably about 1 to 10% by weight. At this point, amines such as triethylamine or pyridine may be added to the solution for promoting hydrolysis. Water is then added to the solution in at least the theoretical amount followed by agitation for hydrolysis. The reaction temperature is from room temperature to the reflux temperature. After the completion of reaction, the reaction solution is added to an organic solvent such as toluene and washed with water. The organic layer is dried over a desiccant such a calcium chloride. With the desiccant filtered off, the organic layer is concentrated, to obtain a hydroxy—terminated polysilane of formula (b) as white powder.

The thus obtained hydroxy—terminated polysilane is dissolved in an inert solvent such as toluene, benzene and xylene, to which an amine such as triethyl amine and pyridine is added. To the solution, an alkenyl—containing chlorosilane of formula (c) is added in at least the theoretical amount based on the hydroxy—terminated polysilane, and the solution is agitated for reaction. The solution of the hydroxy—terminated polysilane in an inert solvent preferably has a concentration of 1 to 20% by weight, especially 5 to 10% by weight. The amount of the amine added is preferably 1 to 20 mol, especially 1 to 10 mol per mol of the hydroxy group in the polysilane. Reaction is preferably carried out at about 40 to 80° C. for about 4 to 8 hours.

After the completion of reaction, the reaction solution is washed with water. The organic layer is dried over a desiccant such as calcium chloride. With the desiccant removed, concentration yields an alkenylsiloxy—terminated polysilane of formula (1) as white powder.

Another essential component of the crosslinkable polysilane composition is (B) a compound having at least three hydrosilyl groups in a molecule, which adds to the alkenylsiloxy—terminated polysilane (A) through hydrosilylation reaction to its alkenylsiloxy groups. The compound must have at least three hydrosilyl ($\equiv$SiH) groups in a molecule in order that the resulting addition product be insoluble in solvents.

Examples of the compound having at least three hydrosilyl groups in a molecule include organohydrogensiloxanes and organohydrogen—silanes. Preferred are hydrogenpolysiloxanes of the following formula (5):

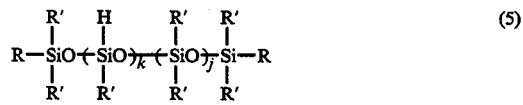

wherein R is a hydrogen atom, a substituted or unsubstituted alkyl group having 1 to 10 carbon atoms, or a substituted or unsubstituted aryl group, R' is a substituted or unsubstituted alkyl group having 1 to 10 carbon atoms, or a substituted or unsubstituted aryl group, letter k is an integer of at least 3, and j is a positive integer inclusive of 0.

In addition to these linear ones, cyclic polysiloxanes of the following formula:

(MeHSiO)$_a$ wherein a is 3, 4, 5 or 6 are also acceptable. Also advantageously used are polyorganosilanes of the following formulae:

(MePhSi)$_b$(MeHSi)$_c$, (MePhHSi)$_3$SiPh,

PhSiH₃, and

H₂PhSiSiPhH₂ wherein Me is methyl, Ph is phenyl, letter $b \geq 0$ and $c \geq 3$.

Preferably the compound having at least three hydrosilyl groups in a molecule (B) is blended with the alkenylsiloxy—terminated polysilane (A) such that compound (B) provides 0.5 to 5 mol, especially 1 to 3 mol of hydrosilyl group per mol of the alkenylsiloxy group in polysilane (A).

The composition of the invention further includes (C) a hydrosilylation catalyst which is effective for catalyzing reaction between the alkenylsiloxy group in polysilane (A) and the hydrosilyl group in compound (B).

The hydrosilylation catalysts used herein include metal complexes of Group VIII in the Periodic Table, for example, complexes of Fe, Ni, Co, Pt, Rh, and Ir. Exemplary rhodium complexes are tris(triphenylphosphine)rhodium chloride, carbonium tris(triphenylphosphine)—rhodium( I ) hydride, chlorobis(cyclooctene)—rhodium( I ) dimer, and rhodium( I ) dicarbonylacetylacetonate. Exemplary platinum complexes are platinum vinylsiloxane and chloroplatinic acid. Rhodium metal complexes are preferred from the point of view of preventing scission of silicon—to—silicon bond.

The catalyst is preferably used as solution in such solvents as toluene, xylene, benzene, tetrahydrofuran and butanol and in an amount of 0.0001 to 1% by weight of metal based on polysilane (A).

In the second form, the crosslinkable polysilane composition of the invention includes a hydrosiloxy—terminated polysilane as essential component (D). Any of the polysilanes which are terminated with a hydrosiloxy group at either end may be used although preferred are those of the following general formula (2).

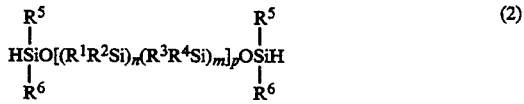   (2)

In formula (2), $R^1$ to $R^6$ and letters n, m and p are as defined above.

For the preparation of the hydrosiloxy-terminated polysilane of formula. (2), the method of U.S. Ser. No. 08/066,513, filed Jan. 21, 1993, U.S. Pat. No. 5,319,051 referred to above is advantageously utilized. More specifically, it is synthesized by first synthesizing a chloro—terminated polysilane of formula (a), hydrolyzing the chloro—terminated polysilane to yield a hydroxy—terminated polysilane of formula (b), and reacting the hydroxy—terminated polysilane with a hydrochlorosilane of formula (d) in alkali.

Cl[(R¹R²Si)ₙ(R³R⁴Si)ₘ]ₚCl   (a)

HO[(R¹R²Si)ₙ(R³R⁴Si)ₘ]ₚOH   (b)

   (d)

In these formulae, $R^1$ to $R^6$, n, m and p are as defined above.

The chloro—terminated polysilane of formula (a) and hydroxy—terminated polysilane of formula (b) are prepared as previously described.

The hydroxy—terminated polysilane is dissolved in an inert solvent such as toluene, benzene and xylene, to which an amine such as triethyl amine and pyridien is added. To the solution, a hydrochlorosilane of formula (d) is added, preferably in at least the theoretical amount based on the hydroxy—terminated polysilane, and the solution is agitated for reaction. The solution of the hydroxy—terminated polysilane in an inert solvent preferably has a concentration of 1 to 20% by weight, especially 5 to 10% by weight. The amount of the amine added is preferably 1 to 20 mol, especially 1 to 10 mol per mol of the hydroxy group in the polysilane. Reaction is preferably carried out at 0 to 30° C. for about 4 to 8 hours.

After the completion of reaction, the reaction solution is washed with water. The organic layer is dried over a desiccant such as calcium chloride. With the desiccant removed, concentration yields a hydrosiloxy—terminated polysilane of formula (2) as white powder.

Another essential component of the crosslinkable polysilane composition is (E) a compound having at least three alkenyl groups in a molecule. Component (E) is a crosslinking agent subject to addition reaction with hydrogen atoms of hydrosiloxy—terminated polysilane (D). The compound must have at least three alkenyl groups in a molecule in order that the resulting addition product be insoluble in solvents. Exemplary of the alkenyl group are vinyl, allyl and propenyl groups.

Examples of the compound having at least three alkenyl groups in a molecule include alkenyl—containing siloxanes and silanes. Preferred are those of the following formulae.

(CH₂=CH)₃—SiOSi—(CH=CH₂)₃

[(CH₂=CH)CH₃SiO]ₐ wherein a=3, 4 or 5

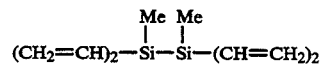

PhSi—(CH=CH₂)₃

Si(CH=CH₂)₄

Preferably the compound having at least three alkenyl groups in a molecule (E) is blended with the hydrosiloxy—terminated polysilane (D.) such that compound (E) provides 0.5 to 5 mol, especially 1 to 3 mol of alkenyl group per mol of the hydrosiloxy group in polysilane (D).

The composition of the invention further includes (C) a hydrosilylation catalyst which is effective for catalyzing addition reaction between the hydrosiloxy group in polysilane (D) and the alkenyl group in compound (E) through hydrosilylation. Examples of the hydrosilylation catalyst used herein are as previously described. The catalyst (C) is preferably used in an amount of 0.0001 to 1% by weight of metal based on polysilane (D).

In the third form, the crosslinkable polysilane composition of the invention includes a hydro—terminated polysilane as essential component (F). Any of the polysilanes which are terminated with a hydrosilyl group at either end may be used although preferred are those of the following general formula (3).

$$H[(R^1R^2Si)_n(R^3R^4Si)_m]_pH \quad (3)$$

In formula (3), $R^1$ to $R^4$ and letters n, m and p are as defined above.

The hydro—terminated polysilanes may be synthesized by reduction reaction of chloro—terminated polysilanes using aluminun hydride, etc.

Another essential component of the crosslinkable polysilane composition is (E) a compound having at least three alkenyl groups in a molecule. Component (E) is a crosslinking agent subject to addition reaction with hydrogen atoms of hydro—terminated polysilane (F).

The composition of the invention further includes (C) a hydrosilylation catalyst which is effective for catalyzing addition reaction between the hydrosilyl group in polysilane (F) and the alkenyl group in compound (E) through hydrosilylation. Examples of components (E) and (C) used herein are as previously described.

Preferably the compound having at least three alkenyl groups in a molecule (E) is blended with the hydro—terminated polysilane (F) such that compound (E) provides 0.5 to 5 mol, especially 1 to 3 mol of alkenyl group per mol of the hydrosilyl group in polysilane (F). The catalyst (C) is preferably used in an amount of 0.0001 to 1% by weight of metal based on polysilane (F).

In the fourth form, the crosslinkable polysilane composition of the invention includes an alkenyl—terminated polysilane as essential component (G). Any of the polysilanes which are terminated with an alkenyl group at either end may be used although preferred are those of the following general formula (4).

$$A[(R^1R^2Si)_n(R^3R^4Si)_m]_pA \quad (4)$$

In formula (4), A, $R^1$ to $R^4$ and letters n, m and p are as defined above.

The alkenyl—terminated polysilanes may be synthesized by reaction of chloro—terminated polysilanes with Grignard reagents or lithium reagents of alkenyl groups.

Another essential component of the crosslinkable polysilane composition in the fourth form is (B) a compound having at least three hydrosilyl groups in a molecule. Component (B) is a compound which adds to alkenyl groups of alkenyl—terminated polysilane (G) through hydrosilylation.

The composition of the invention further includes (C) a hydrosilylation catalyst which is effective for catalyzing addition reaction between the alkenyl group in polysilane (G) and the hydrosilyl group in compound (B). Examples of components (B) and (C) used herein are as previously described.

Preferably the compound having at least three hydrosilyl groups in a molecule (B) is blended with the alkenyl—terminated polysilane (G) such that compound (B) provides 0.5 to 5 mol, especially 1 to 3 mol of hydrosilyl group per mol of the alkenyl group in polysilane (G). The catalyst (C) is preferably used in an amount of 0.0001 to 1% by weight of metal based on polysilane (G).

In any of the first to fourth forms, the crosslinkable polysilane compositions may contain any desired additives such as reaction inhibitors, inorganic fillers, heat resistance modifiers, coloring agents, and adhesion modifiers in addition to the above—mentioned essential components.

The compositions of the invention may be prepared by mixing the essential and optional components in a conventional manner. The compositions are formed into films by conventional film forming means such as a bar coater, and cured by heating at a temperature of about 70 to 200° C. for about ½ to 4 hours, to obtain crosslinked polysilane films which are insoluble in solvents.

EXAMPLE

Examples of the present invention are given below by way of illustration and not by way of limitation.

Example 1

A composition was prepared by dissolving 0.27 grams of a vinylsiloxy—terminated methylphenylpolysilane of the following formula:

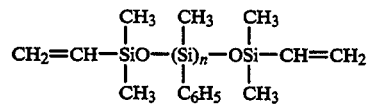

having a number average molecular weight of 5,500 and 0.005 grams of 1,3,5,7—tetramethyl—cyclotetrasiloxane in 0.74 grams of toluene and adding 0.26 grams of a 1% tetrahydrofuran solution of tris(triphenylphosphine)rhodium chloride (catalyst A) thereto. The composition is formed into a film by means of a bar coater and heated at 100° C. for 3 hours to form a crosslinked polysilane film having a thickness of about 10 μm.

A solubility test of this crosslinked polysilane film revealed that it was insoluble in toluene. In a pencil hardness test, the film had a pencil hardness of H.

Example 2-4

The procedure of Example 1 was repeated by using carboniumtris(triphenylphosphine)—rhodium(I) hydride (catalyst B), chloro—bis—(cyclooctene)rhodium(I) dimer (catalyst C) or rhodium(I) dicarbonylacetylacetonate (catalyst D) as the catalyst. As a reference, polysilane films before crosslinking were similarly tested.

It was found that the uncrosslinked polysilane films were soluble in toluene and had a pencil hardness of 2B whereas the crosslinked polysilane films using catalysts B, C and D were insoluble in toluene and had a pencil hardness of H.

Examples 5-8

The procedure of Example 1 was repeated by using tris(methylphenylsilyl)phenylsilane as the organohydrogensilane and catalyst A (Example 5), catalyst B (Example 6), catalyst C (Example 7) or catalyst D (Example 8).

All the crosslinked polysilane films were insoluble in toluene and had a pencil hardness of H.

Examples 9-10

The procedure of Example 1 was repeated by using a toluene solution of platinum vinyl—siloxane containing 1.0% by weight of platinum (Example 9) or a butanol solution of chloro—platinic acid containing 1.0% by weight of platinum (Example 10).

All the crosslinked polysilane films were insoluble in toluene and had a pencil hardness of H. IR analysis showed formation of siloxane.

Example 11

A composition was prepared by dissolving 0.26 grams of a hydrosiloxy-terminated methyl-phenyl-polysilane of the following formula:

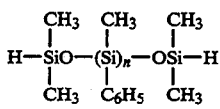

having a number average molecular weight of 5,200 and 0.0078 grams of 1,1,1,3,3,3—hexavinyldisiloxane in 0.74 grams of toluene and adding 0.26 grams of a 1% tetrahydrofuran solution of tris(triphenylphosphine)rhodium chloride (catalyst A) thereto. The composition is formed into a film by means of a bar coater and heated at 100° C. for 3 hours to form a crosslinked polysilane film having a thickness of about 10 μm.

A solubility test of this crosslinked polysilane film revealed that it was insoluble in toluene. In a pencil hardness test, the film had a pencil hardness of H.

Example 12-14

The procedure of Example 11 was repeated by using carboniumtris(triphenylphosphine)—rhodium(I) hydride (catalyst B), chlorobis—(cyclooctene)rhodium(I) dimer (catalyst C) or rhodium(I) dicarbonylacetylacetonate (catalyst D) as the catalyst. As a reference, polysilane films before crosslinking were similarly tested.

It was found that the uncrosslinked polysilane films were soluble in toluene and had a pencil hardness of 2B whereas the crosslinked polysilane films were insoluble in toluene and had a pencil hardness of H.

Example 15-18

The procedure of Example 11 was repeated by using 1,3,5,7—tetravinyl—1,3,5,7—tetramethylcyclotetrasiloxane as the alkenyl compound and catalyst A (Example 15), catalyst B (Example 16), catalyst C (Example 17) or catalyst D (Example 18). All the crosslinked polysilane films were insoluble in toluene and had a pencil-hardness of H.

Example 19-20

The procedure of Example 11 was repeated by using a toluene solution of platinum vinylsiloxane containing 1.0% by weight of platinum (Example 19) or a butanol solution of chloroplatinic acid containing 1.0% by weight of platinum (Example 20).

All the crosslinked polysilane films were insoluble in toluene and had a pencil hardness of H. IR analysis showed formation of siloxane.

Example 21

A composition was prepared by dissolving 0.26 grams of a hydro-terminated methylphenyl—polysilane of the following formula:

having a number average molecular weight of 5,500 and 0.0078 grams of 1,1,1,3,3,3 —hexavinyldisiloxane in 0.74 grams of toluene and adding 0.26 grams of a 1% tetrahydrofuran solution of tris(triphenylphosphine)rhodium chloride (catalyst A) thereto. The composition is formed into a film by means of a bar coater and heated at 100° C. for 3 hours to form a crosslinked polysilane film having a thickness of about 10 μm.

A solubility test of this crosslinked polysilane film revealed that it was insoluble in toluene. In a pencil hardness test, the film had a pencil hardness of H.

Example 22-24

The procedure of Example 21 was repeated by using carboniumtris (triphenylphosphine)—rhodium(I) hydride (catalyst B), chlorobis—(cyclooctene)rhodium(I) dimer (catalyst C) or rhodium(I) dicarbonylacetylacetonate (catalyst D) as the catalyst. As a reference, polysilane films before crosslinking were similarly tested.

It was found that the uncrosslinked polysilane films were soluble in toluene and had a pencil hardness of 2B whereas the crosslinked polysilane films were insoluble in toluene and had a pencil hardness of H.

Example 25-28

The procedure of Example 21 was repeated by using 1,3,5,7 —tetravinyl—1,3,5,7 —tetramethylcyclotetrasiloxane as the alkenyl compound and catalyst A (Example 25), catalyst B (Example 26), catalyst C (Example 27) or catalyst D (Example 28).

All the crosslinked polysilane films were insoluble in toluene and had a pencil hardness of H.

Examples 29-30

The procedure of Example 21 was repeated by using a toluene solution of platinum vinylsiloxane containing 1.0% by weight of platinum (Example 29) or a butanol solution of chloroplatinic acid containing 1.0% by weight of platinum (Example 30).

All the crosslinked polysilane films were insoluble in toluene and had a pencil hardness of H. IR analysis showed that siloxane was newly formed.

Example 31

A composition was prepared by dissolving 0.26 grams of a vinyl—terminated methylphenyl—polysilane of the following formula:

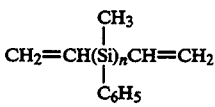

having a number average molecular weight of 5,200 and 0,005 grams 1,3,5,7 —tetramethyl—cyclotetrasiloxane in 0.74 grams of toluene and adding 0.26 grams of a 1% tetrahydrofuran solution of tris(triphenylphosphine)rhodium chloride (catalyst A) thereto. The composition is formed into a film by means of a bar coater and heated at 100° C. for 3 hours to form a crosslinked polysilane film having a thickness of about 10 μm.

A solubility test of this crosslinked polysilane film revealed that it was insoluble in toluene. In a pencil hardness test, the film had a pencil hardness of H.

Examples 32–34

The procedure of Example 31 was repeated by using carboniumtris(triphenylphosphine)—rhodium(I) hydride (catalyst B), chlorobis—(cyclooctene)rhodium(I) dimer (catalyst C) or rhodium(I) dicarbonylacetylacetonate (catalyst D) as the catalyst. As a reference, polysilane films before crosslinking were similarly tested.

It was found that the uncrosslinked polysilane films were soluble in toluene and had a pencil hardness of 2B whereas the crosslinked polysilane films were insoluble in toluene and had a pencil hardness of H.

Examples 35–38

The procedure of Example 31 was repeated by using tris(methylphenylsilyl)phenylsilane as the organohydrogensilane and catalyst A (Example 35), catalyst B (Example 36), catalyst C (Example 37) or catalyst D (Example 38).

All the crosslinked polysilane films were insoluble in toluene and had a pencil hardness of H.

Examples 39–40

The procedure of Example 31 was repeated by using a toluene solution of platinum vinylsiloxane containing 1.0% by weight of platinum (Example 39) or a butanol solution of chloroplatinic acid containing 1.0% by weight of platinum (Example 40).

All the crosslinked polysilane films were insoluble in toluene and had a pencil hardness of H. IR analysis showed that siloxane was newly formed.

Crosslinkable polysilane compositions of the invention undergo crosslinking reaction without scission of a polysilane chain and thus yield cured films which have the inherent properties of polysilane, that is, are solvent insoluble and tough. The cured films are advantageously utilized as the materials which are required to be durable with respect to abrasion and strength.

We claim:

1. A crosslinkable polysilane composition comprising
(A) an alkenylsiloxy-terminated polysilane,
(B) an organohydrogensiloxane or organohydrogensilane having at least three hydrosilyl groups in a molecule, and
(C) a hydrosilylation catalyst.

2. The composition of claim 1 wherein the hydrosilylation catalyst is a rhodium metal complex.

3. The composition of claim 1 wherein the alkenyl—siloxy—terminated polysilane is of the following general formula (1):

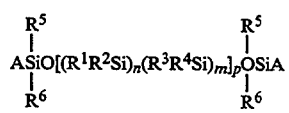

wherein A is an alkenyl group having 2 to 12 carbon atoms, $R^1$, $R^2$, $R^3$, $R^4$, $R^5$, and $R^6$ are independently a substituted or unsubstituted alkyl group having 1 to 12 carbon atoms or a substituted or unsubstituted aryl group, letters n, m and p are integers satisfying $0 \leq n \leq 10$, $0 \leq m \leq 10$, $n+m \geq 10$, and $p \geq 1$.

4. A crosslinkable polysilane composition comprising
(D) a hydrosiloxy-terminated polysilane,
(E) an alkenyl-containing siloxane or silane having at least three alkenyl groups in a molecule, and
(C) a hydrosilylation catalyst.

5. The composition of claim 4 wherein the hydrosilylation catalyst is a rhodium metal complex.

6. The composition of claim 4 wherein the hydrosiloxy—terminated polysilane is of the following general formula (2):

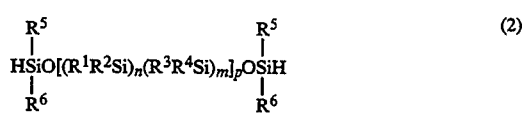

wherein $R^1$ $R^2$ $R^3$ $R^4$ $R^5$ and $R^6$ are independently a substituted or unsubstituted alkyl group having 1 to 12 carbon atoms or a substituted or unsubstituted aryl group, letters n, m and p are integers satisfying $0 \leq n \leq 10$, $0 \leq m \leq 10$, $n+m \geq 10$, and $p \geq 1$.

7. A crosslinkable polysilane composition comprising
(F) a hydro-terminated polysilane,
(E) an alkenyl-containing siloxane or silane having at least three alkenyl groups in a molecule, and
(C) a hydrosilylation catalyst.

8. The composition of claim 7 wherein the hydrosilylation catalyst is a rhodium metal complex.

9. The composition of claim 7 wherein the hydro—terminated polysilane is of the following general formula (3):

wherein $R^1$, $R^2$, $R^3$, and $R^4$ are independently a substituted or unsubstituted alkyl group having 1 to 12 carbon atoms or a substituted or unsubstituted aryl group, letters n, m and p are integers satisfying $0 \leq n \leq 10$, $0 \leq m \leq 10$, $n+m \geq 10$, and $p \geq 1$.

10. A crosslinkable polysilane composition comprising
(G) an alkenyl-terminated polysilane,
(B) an organohydrogensiloxane or organohydrogensilane having at least three hydrosilyl groups in a molecule, and
(C) a hydrosilylation catalyst.

11. The composition of claim 10 wherein the hydrosilylation catalyst is a rhodium metal complex.

12. The composition of claim 10 wherein the alkenyl—terminated polysilane is of the following general formula (4):

wherein A is an alkenyl group having 2 to 12 carbon atoms, $R^1$, $R^2$, $R^3$, and $R^4$ are independently a substituted or unsubstituted alkyl group having 1 to 12 carbon atoms or a substituted or unsubstituted aryl group, letters n, m and p are integers satisfying $0 \leq n \leq 10$, $0 \leq m \leq 10$, $n+m \geq 10$, and $p \geq 1$.

13. The composition of claim 3, wherein A is an alkenyl group having 2 to 10 carbon atoms, and $R^1$, $R^2$, $R^3$, $R^4$, $R^5$ and $R^6$ are independently a substituted or unsubstituted alkyl group having 1 to 10 carbon atoms.

14. The composition of claim 1, wherein said organohydrogensiloxane has the formula

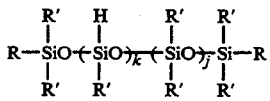

wherein R is a hydrogen atom, a substituted or unsubstituted alkyl group having 1 to 10 carbon atoms, or a substituted or unsubstituted aryl group; R' is a substituted or unsubstituted alkyl group having 1 to 10 carbon atoms, or a substituted-or unsubstituted aryl group; letter k is an integer of at least 3, and j is zero or a positive integer.

15. The composition of claim 1, wherein said organohydrogensiloxane is a cyclic polysiloxane having the formula

(MeHSiO)$_a$ wherein a is 3, 4, 5 or 6 and Me is a methyl group.

16. The composition of claim 1, wherein said organohydrogensiloxane or organohydrogensilane is present in an amount to provide 0.5 to 5 mol hydrosilyl group per mol alkenylsiloxy group in said alkenylsiloxy-terminated polysilane.

17. The composition of claim 1, wherein said hydrosilylation catalyst is present in an amount from 0.0001 to 1% by weight metal based on said alkenyl-siloxy-terminated polysilane.

18. The composition of claim 4, wherein said alkenyl—containing siloxane or silane has a formula selected from the group consisting of

(CH$_2$=CH)$_3$—SiOSi—(CH=CH$_2$)$_3$

[(CH$_2$=CH)CH$_3$SiO]$_a$

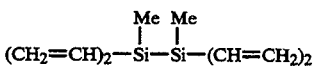

$$\begin{array}{cc} \text{Me} & \text{Me} \\ | & | \\ \text{(CH}_2\text{=CH)}_2\text{—Si} & \text{—Si—(CH=CH}_2\text{)}_2 \end{array}$$

wherein a is the integer 3, 4 or 5; and Me is a methyl group and Ph is a phenyl group.

19. The composition of claim 4, wherein said alkenyl—containing siloxane or silane is present in an amount to provide 0.5 to 5 mol alkenyl group per mol hydrosiloxy group in said hydrosiloxy-terminated polysilane.

20. The composition of claim 4, wherein said hydrosilylation catalyst is present in an amount from 0.0001 to 1% by weight metal based on said hydrosiloxy-terminated polysilane.

21. The composition of claim 7, wherein said alkenyl—containing siloxane or silane is present in an amount to provide 0.5 to 5 mol alkenyl group per mol hydrosilyl group in said hydroterminated polysilane.

22. The composition of claim 7, wherein said hydrosilylation catalyst is present in an amount from 0.0001 to 1% by weight metal based on said hydro-terminated polysilane.

23. The composition of claim 10, wherein said organohydrogensiloxane or organohydrogensilane is present in an amount to provide 0.5 to 5 mol hydrosilyl group per mole alkenyl group in said alkenyl-terminated polysilane.

24. The composition of claim 10, wherein said hydrosilylation catalyst is present in an amount from 0.0001 to 1% by weight metal based on said alkenyl-terminated polysilane.

* * * * *